(12) United States Patent
Noguchi

(10) Patent No.: US 8,159,343 B2
(45) Date of Patent: Apr. 17, 2012

(54) ABNORMALITY DETECTING DEVICE

(75) Inventor: Hideo Noguchi, Nishinomiya (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 437 days.

(21) Appl. No.: 12/542,892

(22) Filed: Aug. 18, 2009

(65) Prior Publication Data

US 2010/0052904 A1 Mar. 4, 2010

(30) Foreign Application Priority Data

Sep. 4, 2008 (JP) .................................. 2008-227362

(51) Int. Cl.
*G08B 13/00* (2006.01)

(52) U.S. Cl. ........................ 340/541; 340/573.1; 348/143

(58) Field of Classification Search .................. 340/541, 340/573.1, 545.3, 286.02, 517, 522, 426.1, 340/5.8, 5.81, 5.83; 348/143, 155, 159, 47, 348/243

See application file for complete search history.

(56) References Cited

U.S. PATENT DOCUMENTS

| 7,221,271 B2 * | 5/2007 | Reime ........................... 340/541 |
| 7,626,608 B2 * | 12/2009 | Takeda et al. .................. 348/143 |
| 2005/0089198 A1 * | 4/2005 | Ono et al. ..................... 382/115 |

FOREIGN PATENT DOCUMENTS

JP 2000-115761 A 4/2000

* cited by examiner

*Primary Examiner* — Anh V La
(74) *Attorney, Agent, or Firm* — Westerman, Hattori, Daniels & Adrian, LLP

(57) ABSTRACT

The abnormality detecting device of this invention comprises a movement detecting unit detecting a presence of a movement of a body based on a video signal in a monitored area, a body detecting unit detecting a predetermined body existence based on the video signal, a brightness level detecting unit detecting a brightness level of the video signal, a determining unit determining whether the detected brightness level is within a predetermined range, a first abnormality detecting unit, in case the brightness level is determined within the predetermined range, detecting the abnormal state occurrence when the movement of the body is detected and the predetermined body is detected, and a second abnormality detecting unit, in case the brightness level is determined to be outside the predetermined range, detecting the abnormal state occurrence when a movement of a body is detected, and detecting the abnormal state occurrence when the predetermined body is detected.

3 Claims, 2 Drawing Sheets

ABNORMALITY DETECTING DEVICE

The application Number 2008-227362, upon which this patent application is based, is hereby incorporated by reference.

BACKGROUND OF THE INVENTION

1. Field of the Invention

The present invention relates to abnormality detecting devices capable of automatically detecting an occurrence of an abnormal state such as invasion of a person into a monitored area based on a video signal in the monitored area, such as a monitoring camera.

2. Description of Related Art

Conventionally, known are a variety of abnormality detecting devices which detect a presence of a movement of a body in a monitored area based on a video signal in the monitored area and detect an occurrence of an abnormal state based on the detecting result (for example, see Japanese Laid-Open Patent Publication No. 2000-115761).

As this kind of abnormality detecting device, for example, known is a monitoring camera which detects a presence of a movement of a body based on an amount of temporal alteration of brightness level of the video signal in the monitored area. In this monitoring camera, one image is divided into a plurality of blocks, and the amount of temporal alteration of the brightness level of the video signal is detected in every block. And when the amount of temporal alteration of the brightness level of the video signal exceeds a threshold, it is determined that there has been a movement of a body, resulting in generation of alarm sound. People around the area are thereby informed of the occurrence of an abnormal state.

However, in the conventional monitoring camera which detects a presence of a movement of a body based on the amount of temporal alteration of the brightness level of the video signal, in the case where it is very bright or very dark in the monitored area, even when an abnormal state occurs, the amount of temporal alteration of the brightness level of the video signal is small, and therefore, the occurrence of an abnormal state may not be detected. For example, in the case where a person wearing black clothes invades the monitored area where it is very dark, the amount of temporal alteration of the brightness level of the video signal does not exceed the threshold, and the occurrence of an abnormal state may not be detected.

On the other hand, in the case where the monitored area is in normal brightness, even when any abnormal state has not been occurred, the occurrence of an abnormal state is likely to be erroneously detected due to a large amount of temporal alteration of the brightness level of the video signal. For example, in the case where the strength of sunlight coming into the monitored area changes, the amount of temporal alteration of the brightness level of the video signal exceeds the threshold and the occurrence of an abnormal state may be erroneously detected.

Therefore, adjustment of the threshold used in the determination of a movement has been performed depending on the brightness in the monitored area. However, the above mentioned problems are still occurring.

SUMMARY OF THE INVENTION

An object of the present invention is to provide an abnormality detecting device capable of reliably detecting the occurrence of an abnormal state as well as preventing erroneous detection regardless of the brightness in the monitored area.

An abnormality detecting device according to the present invention comprises:

a movement detecting unit detecting a presence of a movement of a body in a monitored area based on a video signal in the monitored area;

a body detecting unit detecting an existence of a predetermined body in the monitored area based on the video signal in the monitored area;

a brightness level detecting unit detecting a brightness level of the video signal in the monitored area;

a determining unit determining whether or not the brightness level detected by the brightness level detecting unit is within a predetermined range;

a first abnormality detecting unit, in the case where the brightness level is determined to be within the predetermined range by the determining unit, detecting an occurrence of the abnormal state when a presence of a movement of a body is detected by the movement detecting unit and an existence of the predetermined body is detected by the body detecting unit; and a second abnormality detecting unit, in the case where the brightness level is determined to be outside the predetermined range by the determining unit, detecting the occurrence of the abnormal state when a presence of a movement of a body is detected by the movement detecting unit, and detecting the occurrence of the abnormal state when an existence of the predetermined body is detected by the body detecting unit.

According to the abnormality detecting device of the present invention described above, the brightness level of the video signal in the monitored area is detected, and it is determined whether or not the detected brightness level is within the predetermined range. For example, the movement detecting unit is to detect a presence of a movement of a body based on the amount of temporal alteration of the brightness level of the video signal, and the predetermined range is set to a brightness level range such that in the case where there is a movement of a body, the movement can be detected by the movement detecting unit.

In the case where the monitored area is in normal brightness and the brightness level of the video signal is determined to be within the predetermined range, it is determined that an abnormal state has been occurred when a movement of a body is detected by the movement detecting unit and the predetermined body such as an animal including a person or a car is detected by the body detecting unit. Thereby it is possible to prevent the occurrence of an abnormal state from being erroneously detected even when any abnormal state has not been occurred. For example, in the case where the strength of sunlight coming into the monitored area changes, even when a movement of a body is detected by the movement detecting unit, the predetermined body is not detected by the body detecting unit, and therefore, the occurrence of an abnormal state is not erroneously detected.

In contrast, in the case where it is very bright or very dark in the monitored area and therefore the brightness level of the video signal is determined to be outside the predetermined range, it is determined that an abnormal state has been occurred not only when a movement of a body is detected by the movement detecting unit but also the predetermined body is detected by the body detecting unit. Thereby it is possible to reliably detect the occurrence of an abnormal state when the abnormal state occurs. For example, in the case where a person wearing black clothes invades the monitored area where it is very dark, even if a movement of a body is not detected by the movement detecting unit, the existence of a person is detected by the body detecting unit, thereby detecting the occurrence of an abnormal state.

In particular, provided is a control unit setting a body detecting condition (a condition required for determining that a body is detected) of the body detecting unit to a strict condition in the case where the brightness level is determined to be within the predetermined range by the determining unit, while setting the body detecting condition of the body detecting unit to a lax condition in the case where the brightness level is determined to be outside the predetermined range by the determining unit.

In the particular configuration, in the case where the brightness level of the video signal in the monitored area is determined to be within the predetermined range, the body detecting operation is performed by the body detecting unit on the strict condition, and therefore, as described above, in the case where, the strength of sunlight coming into the monitored area changes, for example, it is possible to reliably prevent the predetermined body from being erroneously detected by the body detecting unit.

In contrast, in the case where the brightness level of the video signal in the monitored area is determined to be outside the predetermined range, the body detecting operation is performed by the body detecting unit on the lax condition, and therefore, as described above, in the case where, for example, a person wearing black clothes invades the monitored area where it is very dark, it is possible to reliably detect the person by the body detecting unit.

As described above, according to the abnormality detecting device of the present invention, regardless of the brightness in the monitored area, it is possible to reliably detect the occurrence of an abnormal state and prevent the erroneous detection.

DETAILED DESCRIPTION OF THE PREFERRED EMBODIMENT

In a preferred embodiment discussed in detail below with reference to drawings, the present invention is implemented in a monitoring camera.

Figure 1:
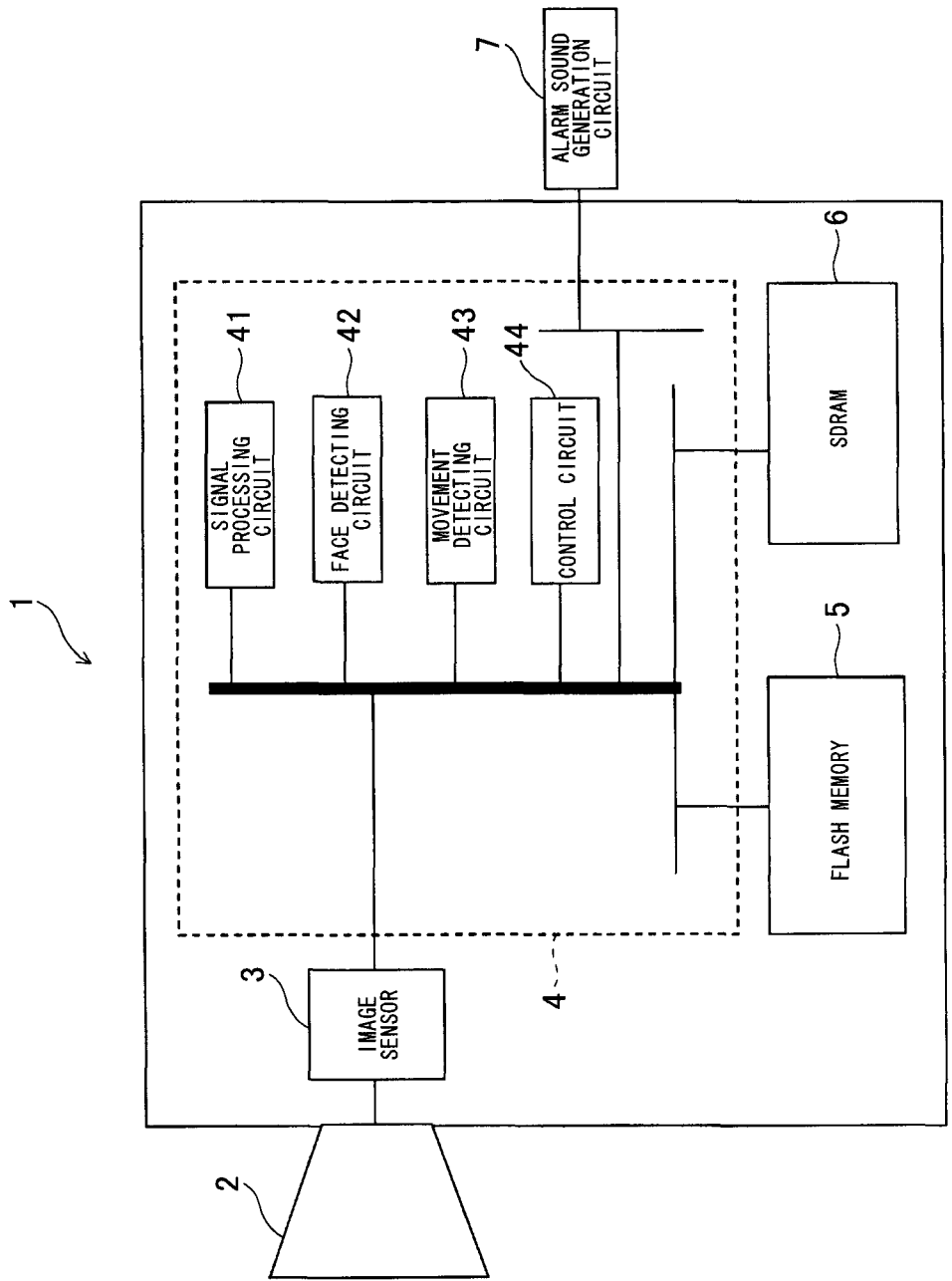
FIG. 1 is a block diagram showing a structure of a monitoring camera which is an embodiment of the present invention.

As shown in FIG. 1, a monitoring camera 1 according to the present invention comprises a shooting lens 2, an image sensor 3, and an ASIC (Application Specific Integrated Circuit) 4. The ASIC 4 comprises a signal processing circuit 41 performing a necessary signal processing such as A/D conversion on an image signal obtained from the image sensor 3, a face detecting circuit 42 detecting an existence of a person's face based on an image signal obtained from the signal processing circuit 41, a movement detecting circuit 43 detecting a presence of a movement of a body based on the image signal obtained from the signal processing circuit 41, and a control circuit 44 controlling an operation of the whole camera. To the ASIC 4, connected are a flush memory 5 storing a variety of information such as a program for controlling the operation of the whole camera and an SDRAM 6 used for the image processing, as well as an alarm sound generation circuit 7 generating alarm sound upon receiving an abnormality detection signal from the control circuit 44.

The monitoring camera described above is placed with the shooting lens 2 facing toward a predetermined monitored area and performs shooting of the monitored area. The image signal obtained from the image sensor 3 is supplied to the signal processing circuit 41 to be subjected to the predetermined signal processing. The image signal thereby obtained is once stored in the SDRAM 6, and thereafter supplied to the face detecting circuit 42, the movement detecting circuit 43, and the control circuit 44.

The face detecting circuit 42 detects an existence of a person's face based on the supplied image signal by a pattern matching method, and supplies a face detection signal to the control circuit 44 when a person's face is detected. A detection precision (a condition required for determining that a face is detected) of the face detecting circuit 42 is altered depending on the control signal from the control circuit 44. The alteration of the detection precision is performed by altering a restriction about a size or an angle of the face to be detected. The restriction about the size of the face can be altered by altering a range of the number of pixels restricting the size of the face to be detected. The restriction about the angle of the face can be altered by altering the number of templates of the face to be detected. In the case where the face detection precision is to be lowered (in the case where the detection condition is set to a lax condition), the range of the number of pixels restricting the size of the face to be detected is expanded and the number of templates of the face to be detected is increased, whereby it is possible to reliably detect the existence of a face in the case where the face exists. In contrast, in the case where the face detection precision is to be enhanced (in the case where the detection condition is set to a strict condition), the range of the number of pixels restricting the size of the face to be detected is narrowed and the number of templates of the face to be detected is decreased, whereby it is possible to prevent the existence of a face from being erroneously detected when the face does not exist. Since the face detecting process by the pattern matching method is known, a detail explanation is omitted.

The movement detecting circuit 43 repeats an operation of dividing one image into a plurality of blocks, detecting in every block the amount of temporal alteration of the brightness level of the video signal supplied as described above, and determining whether or not the detected amount of alteration exceeds a predetermined threshold. When the detected amount of alteration exceeds the predetermined threshold, the movement detecting circuit 43 determines that there has been a movement of a body, and supplies a movement detection signal to the control circuit 44.

The control circuit 44 detects the brightness level of the video signal supplied as described above, and determines whether or not the detected brightness level is within the predetermined range. The predetermined range is set to a brightness level range such that in the case where there is a movement of a body, the movement can be reliably detected by the movement detecting circuit 43.

In the case where the control circuit 44 determines that the brightness level of the supplied video signal is within the predetermined range, the control circuit 44 makes the face detecting circuit 42 perform a face detection operation with a high precision. Then, the control circuit 44 outputs the abnormality detection signal to the alarm sound generation circuit 7 when a movement of a body is detected by the movement detecting circuit 43 and a person's face is detected by the face detecting circuit 42.

In contrast, in the case where the control circuit 44 determines that the brightness level of the supplied video signal is outside the predetermined range, the control circuit 44 makes the face detecting circuit 42 perform a face detection operation with a low precision. Then, the control circuit 44 outputs the abnormality detection signal to the alarm sound generation circuit 7 when a movement of a body is detected by the movement detecting circuit 43, and it outputs the abnormality detection signal to the alarm sound generation circuit 7 when a person's face is detected by the face detecting circuit 42.

The alarm sound generation circuit 7 generates the alarm sound upon receiving the abnormality detection signal outputted by the control circuit 44 as described above, whereby people around the area are informed of the occurrence of an abnormal state.

In the monitoring camera according to the present invention, in the case where the monitored area is in the normal brightness, the brightness level of the video signal is determined to be within the predetermined range, and the face detection operation is performed by the face detecting circuit 42 with a high precision. Then, only when a movement of a body is detected by the movement detecting circuit 43 and a person's face is detected by the face detecting circuit 42, the abnormality detection signal is outputted to the alarm sound generation circuit 7. Thereby it is possible to prevent the occurrence of an abnormal state from being erroneously detected. Although the face detection precision is enhanced, the brightness level of the video signal is within the range of the normal brightness and the image signal for one frame is obtained in a short time, and therefore, it does not take a long time for the face detecting process.

For example, in the case where the strength of sunlight coming into the monitored area changes, even when the brightness level of the video signal largely changes and a movement of a body is detected by the movement detecting circuit 43, the face detecting operation is performed by the face detecting circuit 42 with a high precision, and therefore, a person's face is not erroneously detected and the occurrence of an abnormal state is not detected. Also, for example, in the case where a person invades the monitored area, the amount of temporal alteration of the brightness level of the video signal exceeds the predetermined threshold and a movement of a body is detected by the movement detecting circuit 43 and a person's face is detected by the face detecting circuit 42, whereby the occurrence of an abnormal state is detected.

Also, in the case where it is very bright or very dark in the monitored area, the brightness level of the video signal is determined to be outside the predetermined range, and the face detection operation is performed by the face detecting circuit 42 with a low precision. Then, the abnormality detection signal is outputted to the alarm sound generation circuit 7 when a movement of a body is detected by the movement detecting circuit 43, and the abnormality detection signal is outputted to the alarm sound generation circuit 7 when a person's face is detected by the face detecting circuit 42. Thereby it is possible to reliably detect the occurrence of an abnormal state when the abnormal state occurs.

For example, in the case where a person wearing black clothes invades the monitored area where it is very dark, even when the amount of alteration of the brightness level of the video signal is small and therefore a movement of a body is not detected by the movement detecting circuit 43, since the face detection operation is performed by the face detecting circuit 42 with a low precision, the face is reliably detected and the occurrence of an abnormal state is detected. In the case where a person wearing light-colored clothes invades the monitored area where it is very dark, the amount of temporal alteration of the brightness level of the video signal exceeds the threshold, and a movement of a body is detected by the movement detecting circuit 43, whereby the occurrence of the abnormal state is detected.

Figure 2:
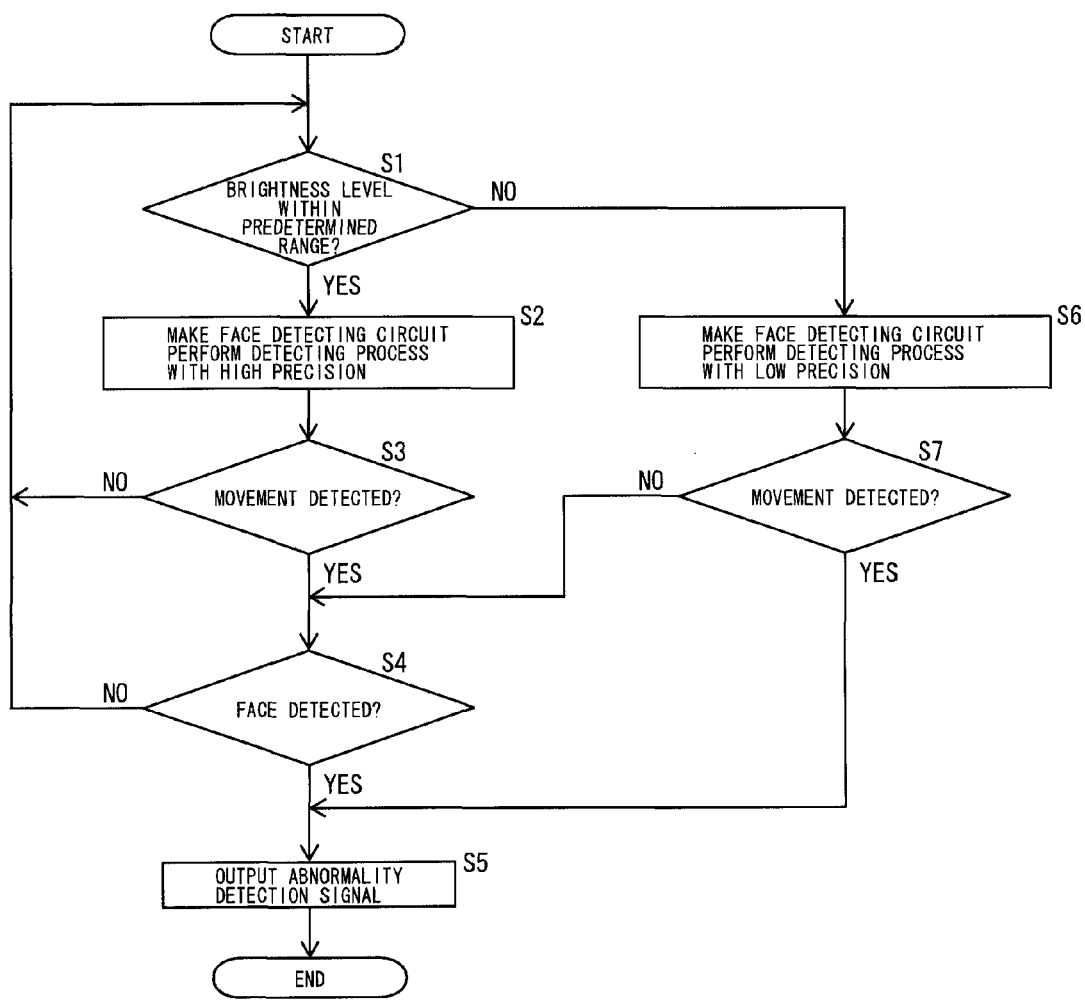
FIG. 2 is a flow chart illustrating an abnormality detecting process performed in the monitoring camera.

FIG. 2 shows an abnormality detecting process performed by the control circuit 44. First in step S1, it is determined whether or not the brightness level of the supplied video signal is within the predetermined range. When it is determined YES, the process proceeds to step S2 to make the face detecting circuit perform the face detection operation with a high precision. Next in step S3, it is determined whether or not a movement of a body has been detected by the movement detecting circuit, in other words, whether or not the movement detection signal has been received from the movement detecting circuit. When it is determined NO, the process returns to step S1. When a movement of a body has been detected by the movement detecting circuit and therefore it is determined YES in step S3, the process proceeds to step S4 to determine whether or not a person's face has been detected by the face detecting circuit, in other words, whether or not the face detection signal has been received from the face detecting circuit. When it is determined NO, the process returns to step S1. When it is determined YES, the abnormality detection signal is outputted in step S5, and the process ends.

As described above, in the case where the brightness level of the video signal is within the predetermined range, the abnormality detection signal is outputted only when a movement of a body is detected by the movement detecting circuit and a person's face is detected by the face detecting circuit.

In the case where the brightness level of the supplied video signal is outside the predetermined range and therefore it is determined NO in step S1, the process proceeds to step S6 to make the face detecting circuit perform the face detection operation with a low precision. Next in step S7, it is determined whether or not a movement of a body has been determined by the movement detecting circuit, in other words, whether or not the movement detection signal has been received from the movement detecting circuit. When it is determined YES, the abnormality detection signal is outputted in step S5, and the process ends. When it is determined NO in step S7, the process proceeds to step S4 to determine whether or not a person's face has been detected by the face detecting circuit, in other words, whether or not the face detection signal has been received from the face detecting circuit. When it is determined NO, the process returns to step S1. When it is determined YES, the abnormality detection signal is outputted in step S5, and the process ends.

As described above, in the case where the brightness level of the video signal is outside the predetermined range, the abnormality detection signal is outputted when a movement of a body is detected by the movement detecting circuit, and when a person's face is detected by the face detecting circuit.

According to the monitoring camera of the present invention, regardless of the brightness in the monitored area, it is possible to reliably detect the occurrence of an abnormal state and prevent the erroneous detection.

In the embodiment described above, the pattern matching method is adopted as a face detecting method. However, not limited to this, it is possible to adopt a variety of known methods such as a method of detecting a person's face by extracting skin color area.

Also, as a movement detecting method, the method of detecting a movement based on the amount of temporal alteration of the brightness level of the video signal is adopted. However, it is possible to adopt a variety of known methods such as a method of detecting a moving vector of a body and detecting a presence of a movement based on the moving vector.

Also, instead of the face detecting circuit 42, it is possible to adopt a variety of body detecting circuits such as a circuit detecting a whole person, a circuit detecting an animal other than person, or a circuit detecting an object such as a car.

Further, in the embodiment described above, the present invention is implemented in a monitoring camera. However, not limited to this, it is possible to implement the present invention in a signal recording device which is connected to a monitoring camera and records a video signal obtained from the monitoring camera on a memory medium.

Still further, in the embodiment described above, the alarm sound is generated when the occurrence of an abnormal state is detected. However, it is possible to adopt a structure in which, of a plurality of blocks constituting one image, an image of a block where a movement is detected or a block where a body is detected is enlarged, or a structure in which the direction of the shooting lens is altered so that the block where a movement is detected or the block where a body is detected is located at the center of the one image.

What is claimed is:

1. An abnormality detecting device detecting an occurrence of an abnormal state in a monitored area based on a video signal in the monitored area comprising:
    a movement detecting unit detecting a presence of a movement of a body in the monitored area based on the video signal in the monitored area;
    a body detecting unit detecting an existence of a predetermined body in the monitored area based on the video signal in the monitored area;
    a brightness level detecting unit detecting a brightness level of the video signal in the monitored area;
    a determining unit determining whether or not the brightness level detected by the brightness level detecting unit is within a predetermined range;
    a first abnormality detecting unit, in the case where the brightness level is determined to be within the predetermined range by the determining unit, detecting the occurrence of the abnormal state when a presence of a movement of a body is detected by the movement detecting unit and an existence of the predetermined body is detected by the body detecting unit; and
    a second abnormality detecting unit, in the case where the brightness level is determined to be outside the predetermined range by the determining unit, detecting the occurrence of the abnormal state when a presence of a movement of a body is detected by the movement detecting unit, and detecting the occurrence of the abnormal state when an existence of the predetermined body is detected by the body detecting unit.

2. The abnormality detecting device according to claim 1, wherein the abnormality detecting device comprises a control unit setting a body detecting condition of the body detecting unit to a strict condition in the case where the brightness level is determined to be within the predetermined range by the determining unit, while setting the body detecting condition of the body detecting unit to a lax condition in the case where the brightness level is determined to be outside the predetermined range by the determining unit.

3. The abnormality detecting device according to claim 1, wherein the movement detecting unit detects a presence of a movement of a body based on an amount of temporal alteration of the brightness level of the video signal.

* * * * *